United States Patent
Preschke

(10) Patent No.: US 9,321,590 B2
(45) Date of Patent: Apr. 26, 2016

(54) STORAGE SYSTEM HAVING LATCHABLE WALL PANELS AND SUPPORTS, KIT SUCH WALL PANELS AND SUPPORTS, AND ASSEMBLY METHOD FOR AUTOMATIC STORAGE SYSTEMS

(75) Inventor: Harald Preschke, Vöhringen (DE)

(73) Assignee: KARDEX PRODUKTION DEUTSCHLAND GMBH (DE)

(*) Notice: Subject to any disclaimer, the term of this patent is extended or adjusted under 35 U.S.C. 154(b) by 411 days.

(21) Appl. No.: 13/133,386

(22) PCT Filed: Dec. 8, 2009

(86) PCT No.: PCT/EP2009/008761
§ 371 (c)(1),
(2), (4) Date: Nov. 27, 2011

(87) PCT Pub. No.: WO2010/075938
PCT Pub. Date: Jul. 8, 2010

(65) Prior Publication Data
US 2012/0103979 A1 May 3, 2012

(30) Foreign Application Priority Data

Dec. 8, 2008 (DE) .................... 20 2008 016 153 U
Oct. 29, 2009 (DE) .................... 10 2009 051 195

(51) Int. Cl.
*B65D 6/28* (2006.01)
*B65G 1/02* (2006.01)
(Continued)

(52) U.S. Cl.
CPC . *B65G 1/02* (2013.01); *A47B 47/03* (2013.01); *F16B 12/02* (2013.01); *B65G 1/127* (2013.01)

(58) Field of Classification Search
CPC .......... B65G 1/02; B65G 1/127; A47B 47/03; F16B 12/02
USPC ............ 220/4.01, 4.28, 1.5, 4.26, 62.11, 500, 220/638, 639, 646, 647, 668, 677, 692
See application file for complete search history.

(56) References Cited

U.S. PATENT DOCUMENTS 4,823,984 A * 4/1989 Ficken ............................. 221/96
5,097,986 A * 3/1992 Domberg et al. ......... 221/150 R
(Continued)

FOREIGN PATENT DOCUMENTS

CH 568205 A5 10/1975
DE 2110717 C2 9/1971
(Continued)

OTHER PUBLICATIONS

International Search Report for PCT/EP2009/008761, dated Apr. 7, 2010, 4 pages.

*Primary Examiner* — Fenn Mathew
*Assistant Examiner* — Elizabeth Volz
(74) *Attorney, Agent, or Firm* — Edell, Shapiro & Finnan, LLC

(57) ABSTRACT

The invention relates to an automatic storage system having a storage volume enclosed at least sectionwise by a covering made of at least one wall panel (3), wherein the wall panel (3) is attached to a support structure. The invention further relates to a kit for automatic storage systems and to a method for assembling an automatic storage system (1), wherein at least one wall panel (3) is placed on at least one support (8) substantially transverse to a longitudinal axis of the support (8). In order to simplify the assembly of the storage system, according to the invention, attachment segments (3c) or mounting segments (8b) designed as latching elements on the wall panels (3) and the supports (8) have at least one mounting surface (3d) facing outward.

14 Claims, 10 Drawing Sheets

Figure 1:
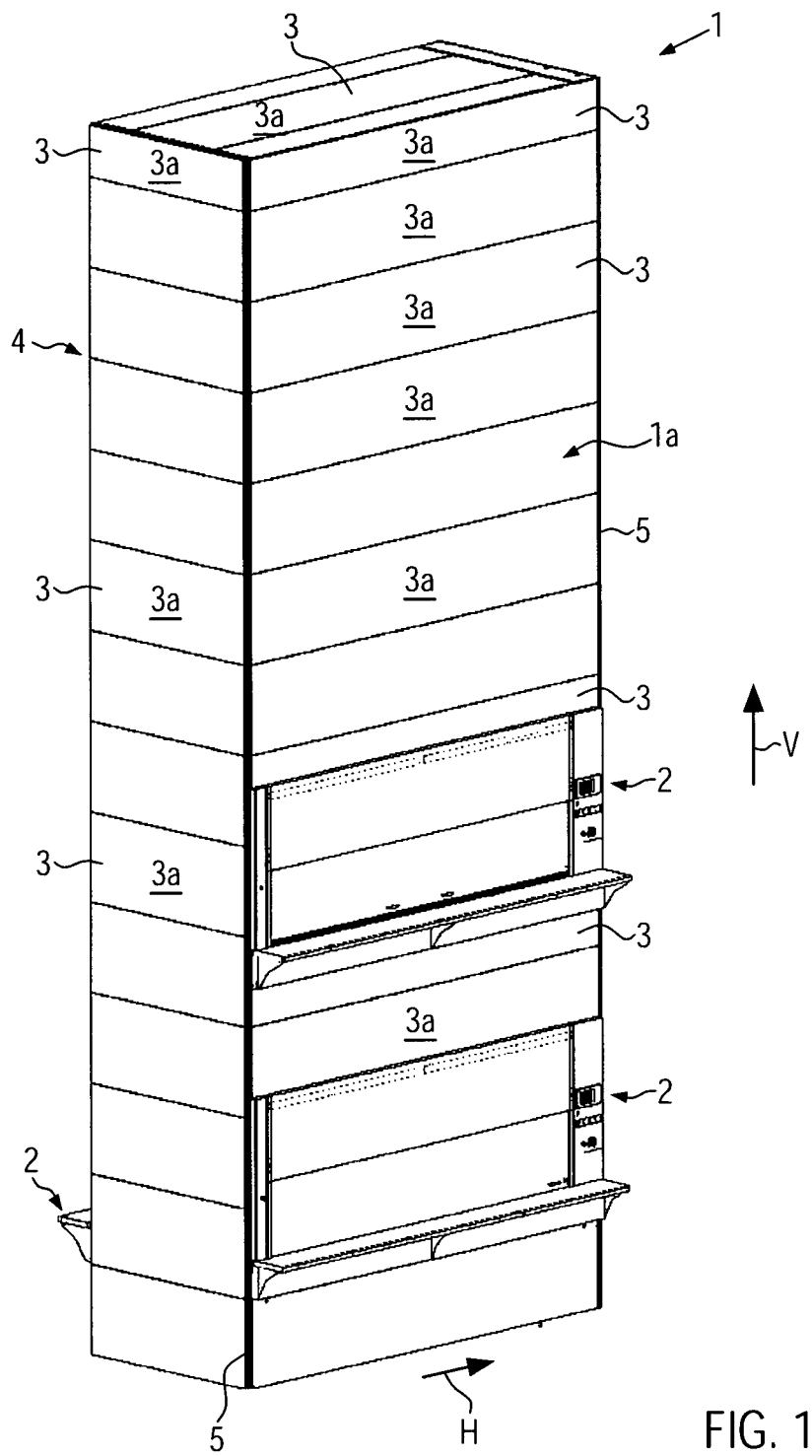

(51) Int. Cl.
  *A47B 47/03* (2006.01)
  *F16B 12/02* (2006.01)
  *B65G 1/127* (2006.01)

(56) References Cited

U.S. PATENT DOCUMENTS 6,752,285 B1 * 6/2004 Scalf ............................ 220/4.32
2002/0153338 A1  10/2002  Orr
2003/0102277 A1 *  6/2003  Tai et al. ........................ 211/187

FOREIGN PATENT DOCUMENTS

| | | |
|---|---|---|
| DE | 29709531 U1 | 7/1997 |
| DE | 29803113 U1 | 4/1998 |
| DE | 20105580 U1 | 8/2002 |
| DE | 20304872 U1 | 4/2004 |
| EP | 0262090 A1 | 3/1988 |
| GB | 2032037 A | 4/1980 |

* cited by examiner

STORAGE SYSTEM HAVING LATCHABLE WALL PANELS AND SUPPORTS, KIT SUCH WALL PANELS AND SUPPORTS, AND ASSEMBLY METHOD FOR AUTOMATIC STORAGE SYSTEMS

The invention relates to an automatic storage system having a storage volume enclosed at least sectionwise by a covering made of at least one wall panel, whereby the wall panel is attached to a support structure. The invention further relates to a kit for automatic storage systems and to a method for assembling a storage system from a kit, whereby at least one wall panel is placed on at least one support substantially transverse to a longitudinal axis of the support.

Automatic storage systems of the abovementioned type are known, for example, as circulating racks or paternoster or storage lift systems for automatic storage and retrieval of storage goods. As parts of such automatic storage systems, wall panels enclose a storage volume in order to protect this volume from external influences and prevent the storage goods from falling out of the storage system. Circulating racks are dynamic storage devices up to 15 or more meters high that can bear loads up to the tonne range. In order to guarantee sufficient safety for the operator, the devices must fulfil strict safety requirements. For example, these requirements also include that loads that experience to some extent substantial centrifugal acceleration as the storage good carriers circulate must be secured to prevent them from unintentionally falling out of the circulating rack. One way in which this securing is effected is by covering the circulating rack with pieces of metal sheets or the like. These metal sheets and their attachment must thereby be designed in order to bear up against the stored goods when they impinge on the covering.

Normally for constructing a storage system, a multiplicity of plates or wall panels are attached to a support structure that is preferably made of posts or supports, whereby the support structure holds the wall panels together for forming a closed housing. In order to make it possible also to absorb larger forces that can act on the wall panels when storage goods fall out, the wall panels are attached to the support structure with stable attachment elements, for example, screws, or are welded to the support structure. This results in complex and cost-intensive assembly and dismantling.

In order to simplify the assembly of the sheet metal covering, EP 0 114 671 proposes attaching the sheet metal covering of a circulating rack without screws. For this purpose, metal sheets having pressed-out bars are attached to the posts of the framework of a cabinet. S-shaped bent spring clips having a side piece are inserted into the openings bounded by the bars, with a covering plate being hung into the other side pieces of said spring clips. Detrimental in the proposed system is that this requires an additional element in the form of a spring clip for connecting the sheet metal covering and posts. The construction times and the total costs are likewise only minimally reduced, and the resisting power of the covering is not substantially increased.

The object of the present invention is consequently to create an automatic storage system that can be assembled and dismantled easily and economically.

This object is solved according to the invention for an automatic storage system of the type mentioned at the beginning by means of latching the wall panel to the support structure.

The latching of the wall panel to the support structure leads to a distinct simplification of the assembly procedure, whereby the assembly of the wall panel is preferably carried out without tools. The wall panel is preferably pressed into the latching from the outside for assembly, and because of this, is automatically held to the support structure. To dismantle the wall panel, it is only necessary to deflect the segment of the wall panel latched to the support structure with respect to the support structure. For a kit according to the invention, the abovementioned object is solved in that the kit comprises at least one support for constructing a support structure of a storage system, whereby the support structure encloses an automatic storage volume, with at least one mounting segment for attaching wall panels, wherein the mounting segment is designed as a latching element with at least one mounting surface facing in the direction of the storage volume, and/or at least one wall panel that can be latched to the support and that on opposing sides of an outer wall segment forming an outward facing wall outer surface has two side areas extending transversely to the outer wall segment, each with at least one attachment surface integrated into the side areas and designed as a latching element with at least one outward facing mounting surface. The kit with the wall panel can preferably be assembled without auxiliary materials solely by latching its elements.

The solution according to the invention can be combined and further improved in any way with the following further development forms, each of which is advantageous in itself:

According to a first advantageous development, the wall panel can, on opposing sides of an outer wall segment forming an outward facing wall outer surface, be provided with two side areas that extend transverse to the outer wall segment, each of which has at least one attachment segment integrated into the side areas and designed as a latching element with at least one outwardly facing mounting surface.

The design of the attachment segment as a latching element allows a simple latching of the wall panel during assembly without additional attachment elements being necessary. For assembly, the wall panel is preferably pressed against the support structure from the outside. The wall panel can be formed in an automatically latching manner so that the assembly can take place without additional auxiliary materials.

The latching of a wall panel can be designed detachably by deflecting the attachment segment with respect to the support structure. This significantly simplifies the dismantling of the storage system. The deflection of the attachment segments can be carried out without tools or with the help of simply designed tools, for example, with a lever.

The segment of the support structure or of the support on which the mounting surfaces of the wall panel lie is, in an advantageous development, arranged in particular between the side areas. The side area or the mounting surfaces of the wall panel can consequently engage behind a segment of a support structure or of a support of the storage system in the assembled state. The mounting surfaces are furthermore preferably substantially rigidly connected to the outer wall segment, for example, as bevelled areas. In this embodiment, a deformation of the outer wall segment due to a loading of the wall panel from inside reinforces the attachment of the wall panels to the support structure. This effect substantially increases the safety of the storage system. For example, if storage goods that slip or fall from inside or from the storage volume reach the outer wall segment and if the outer wall segment is bent outwards as a consequence of this, the mounting surfaces that are substantially rigidly connected to the outer wall segment together with the adjacent areas of the outer wall segment are loaded with respect to the support structure of the storage system in such a way that the mounting surfaces brace themselves against a separation from the support.

At the same time, the bending of the outer wall segment can lead to a decrease in the distance between opposing side areas, as a result of which the side areas are additionally pressed on to the support structure.

According to a further advantageous embodiment of the wall panel, the mounting surfaces of a side area can extend in a vertical direction running parallel to the outer wall segment across a total of at least one third of the height of the outer wall segment. The wall panels can have a multiplicity of attachment segments that are preferably uniformly distributed across the side area. In this way, high loads can be absorbed by the attachment segments, even in the case of very lightly created, less deflection-resistant wall panels. Due to the fact that a multiplicity of attachment segments connect a side area to the support structure of the storage system, the wall panel is additionally stiffened by the connected support structure. The number of attachment points, which is higher than in conventional wall panels, does not increase the assembly effort as do welded or screw joints, because the latching elements of a wall panel latch automatically and virtually simultaneously during its assembly.

A side area can preferably have at least roughly five, at least roughly ten or more than ten attachment segments. The attachment segments are preferably arranged behind one another in parallel to the outer wall segment, preferably flush. In this way, the bearing surface of the wall panels at the attachment segments can be enlarged and the strength of the covering can be increased without enlarging individual attachment segments.

In order to further increase the carrying capacity of the attachment of a wall panel, this can also be given side areas, in further advantageous embodiments, on three or four sides of the outer wall segment instead of only on two opposing sides, wherein the attachment segments are integrated into these side areas.

The wall panel can furthermore be equipped with stiffeners on opposing sides of the outer wall segment, whereby these stiffeners particularly increase the flexural strength of a wall panel and consequently stiffen two opposing sides of the outer wall segment that are not attached to the support structure by means of side areas. Each of the stiffeners can be formed by one or two chamfers. The chamfers can form a profile body.

In a further advantageous embodiment, the wall panel can have support surfaces opposing the side areas in a direction running parallel to the outer wall segment, each of which, together with the side areas, forms a recess for retaining one support each. In this way, loads of the outer wall segments, in particular side loads acting on the outer wall segment from the inside, are at least partially introduced into the supports or the support structure of the storage system by means of additional support surfaces, and the attachment segments are unloaded. The wall panel is preferably equipped with stiffeners that lie opposite one another with regard to the outer wall segment, whereby these stiffeners form the support surfaces.

For simple manufacture of the wall panels, the attachment segment can be formed from an opening running substantially parallel to the outer wall segment. The mounting surface can be formed by an inward facing surface of the opening. The opening can be formed as a rectangle, whereby one of the long sides of the rectangle preferably forms the mounting surface. The wall panel can be manufactured from sheet metal and, for example, be given attachment segments formed from stamped openings. The wall panel can alternatively be manufactured from web material that is provided with stamped attachment segments. The wall panel can furthermore be cast from plastic and the attachment segments can be produced in a manufacturing step during the casting of the wall panel. Impact-resistant, non-brittle plastics, for example, fibre-reinforced plastics, are suitable for this.

According to a further advantageous development of the wall panel, the attachment segments can be formed from, for example, cuboidal extensions that extend away from the side areas in parallel to the outer wall segment. The mounting surface can be formed by a side surface of the extensions. The attachment segments developed as extensions can extend in the direction of the outer wall segment or away from this in order to form mounting surfaces running substantially parallel to the outer wall segment.

The side areas of a wall panel can particularly be elastically deflectable in a direction facing away from the outer wall surface in order to make it possible to engage latching elements of the wall panel with latching elements of supports arranged on both sides of the wall panel. The attachment segments of the side segments can, for example, be formed by openings that engage in support mounting segments developed as extensions and facing away from the outer wall surface. In this way, when a wall panel is put into position, mounting segments of two supports that run parallel to each other are held between two side areas that run parallel to each other in that the area between the side segments is enlarged due to elastic deformation of the side segments. The side segments of the wall panels spring back into their original position only after the mounting segments of the supports and the attachment segments of the wall panels align with one another.

In order to simplify the insertion of the wall panels, these free ends of the attachment segments can form guide or assembly bevels that are tilted with respect to the other attachment segment.

For a support according to the invention, the abovementioned object is solved in that the mounting segment is developed as a latching element with at least one mounting surface facing in the direction of the storage volume. The development as a latching element makes possible a simple and fast assembly of wall panels, while a mounting surface facing in the direction of the storage volume catches forces resulting from falling or shifted objects in the storage system.

According to an advantageous development of the support, the at least one mounting segment can be formed by an extension integrated into the support, whereby this extension extends away from the support, parallel to the mounting surface, and, in the assembled state of the storage system, parallel to the outer wall segment. The attachment segment can alternatively be formed by an opening extended substantially parallel to the mounting surface or parallel to the outer wall segment, whereby at least one inner surface of the opening forms the mounting surface of the support.

In a further advantageous development, the support can have side areas that run parallel to one another and in a longitudinal direction of the support, whereby the mounting segments are arranged on these side areas. A side area of a support can preferably have five or more mounting segments in order to enlarge the total of the mounting surfaces.

The support can advantageously be developed as a profile body that can be manufactured at least in a first manufacturing step in a strand casting and/or extrusion procedure. The support preferably has a substantially C-shaped cross-section, on opposing ends of which the side areas and/or mounting segments for attachment of at least one wall panel each are arranged.

The mounting segments on opposing ends of the C-, L- or U-shaped cross-section or the mounting surfaces of these mounting segments can run parallel to one another in order to arrange the wall panels attached to the support in a common plane. In this way, wall panels attached on opposing sides of the support can form a level wall.

In a further advantageous development, the opposing mounting segments can be angled to one another at the ends of the C-shaped cross-section in order to create a correspondingly angled wall with wall panels. The mounting segments are preferably arranged at an angle of roughly 90° to one another so that connected wall panels also form an angle of roughly 90°. The supports can consequently serve as corner posts of a support structure that form a substantially rectangular housing of a storage system with only the wall panels attached to the corner posts.

With regard to the kit for storage systems, the abovementioned object is solved in that the kit comprises at least one support according to the invention and/or a wall panel according to the invention that can be latched to the support corresponding to the above advantageous developments. The wall panels and/or supports that can be assembled by fitting them together lead to a distinct simplification of the assembly of the storage system, which results in a reduction of the assembly effort and the assembly costs.

In order to secure assembled wall panels to the support after their assembly, a mounting element can be provided that is developed such that it can be inserted in a positive fit between side areas of two wall panels that are adjacent in a horizontal direction and by means of which the side areas can be connected to each other in a positive fit. The side areas of adjacent wall panels can be supported on one another by means of the mounting element in order to transfer unintentional separation forces that act on a side area to the adjacent side area and in this way absorb them.

The attachment segments of adjacent side areas can be arranged at an angle to each other or can face in opposite directions so that a force that acts on a mounting element arranged between the side areas presses at least one side area of a wall panel to the attachment segment of the connected support. In this way, a force that presses against a wall panel from the inside is absorbed by means of the side area of an adjacent wall panel.

For a positive-fit connection to a mounting element, the side areas can have mounting extensions that can be introduced into the mounting element. The mounting extensions can run diagonally to the outer wall segments, whereby mounting extensions of two wall panels that are adjacent to each other in a horizontal direction extend towards one another. In order to make it possible to introduce the mounting extensions of two adjacent wall panels into a level slot of the mounting element, an angle of roughly 135° can be provided between the areas of the side area comprising the attachment segments, which run perpendicular to the outer wall segment, and the mounting extensions.

According to a further advantageous development of the kit, the mounting element can have a cross-shaped profile in a horizontal direction in which the mounting element is inserted between wall panels. Between wall panels that are adjacent in a vertical and/or a horizontal direction, a gap or a slot can remain between the side areas in each case, whereby the slots remaining between four meeting wall panels form a cross-shaped slot. In this way, the mounting element can also be introduced into the remaining cross-shaped slot between four meeting wall panels when the wall panels have been assembled. The cross-shaped profile of the mounting element can be adapted to the dimensions of the crossed slot formed by the four meeting side areas.

Two adjacent wall panels can form a slot-shaped retainer for retaining the mounting element, whereby the mounting element can be slid into the retainer. The side areas can have mounting extensions that are formed so that they are flat and run towards one another. The mounting extensions can form a groove for a displaceable retention of the mounting element. Because the mounting element can be held in a displaceable manner in a gap formed between two adjacent side areas, the position of the mounting element can be adjusted by a displacement within the gap.

The mounting element can have undercuts into which side areas of adjacent wall panels can be introduced. The undercuts can be developed as continuous slot-shaped retainers whose dimensions are adapted to the dimensions of the side areas to be retained. Two opposing slot-shaped retainers can be provided on a mounting element.

In order to produce a frictional connection between the mounting element and the retained side areas that locks the mounting element in a certain position in addition to the positive locking, the mounting element can be developed so that it is elastically deflectable, at least in segments. Lateral restrictions of the slot-shaped retainers of the mounting element can be formed from a curved, elastically deflectable segment of the mounting element, whereby this segment elastically presses against the side areas if side areas are retained in the mounting element and consequently produces a frictional connection between the side areas and the mounting element.

In order to improve the supporting effect of the mounting element with respect to the side areas, in a further advantageous development, the mounting element can be designed as a slot nut that lies on at least three sides of each side area arranged in the gap between side areas and that consequently stiffens the side areas with respect to a deformation arising transverse to the slot formed by the side areas.

For protection of the side areas of the wall panels against access from outside, the mounting element can be latchable with a protective cover which covers the side segments of at least two adjacent wall panels. The mounting element can comprise a latching extension in order to make it possible to latch the protective cover to the mounting elements. The protective cover can consequently also be assembled without tools.

The protective cover, which can be latched to the mounting element or to a plurality of adjacently arranged mounting elements, can particularly lie on surfaces, substantially arranged opposing one another, of adjacent side areas in order to prevent a separation of the latching connection between side areas and supports.

The protective cover can cover the side areas of adjacent wall panels towards the outside in order to avoid an unintentional separation of the side areas from a support situated underneath them. The protective cover can furthermore advantageously form an outer surface that lies flush with outer wall surfaces of the wall panels. In this way, no projections or recesses arise in the outer wall of the storage system that could allow objects or persons to get caught or stuck.

The protective cover preferably comprises at least one support segment that lies, at least in segments, on the side areas of wall panels that are adjacent to one another. In this way, the protective cover blocks adjacent side areas from unintentional separation.

The abovementioned object is solved in a method according to the invention in that during the placement of a wall panel, at least one mounting segment of the support automatically engages in a positive fit in at least one attachment segment of the wall panel. In this way, just the placement of the wall panel is sufficient to attach the wall panel to the support. The positive locking alone preferably holds the wall panel to the support structure without additional means of attachment.

The mounting element, which serves to secure the attachment of two adjacent wall panels, can be inserted into a crossed slot formed by four wall panels and subsequently slid in a vertical direction. In this way, the mounting element, like the wall panel, can be assembled without the use of tools.

In order to create a covering for storage lifts, storage systems or particularly for circulating racks that produces a stiffening of the shelf construction in addition to increased resisting power and that at the same time can be assembled in an especially simple and fast manner, the covering can comprise a plurality of supports and panels, particularly metal sheets, arranged between the supports. The posts or supports can have angled long sides with a multiplicity of uniformly spaced projections and the ends of plates or wall panels facing the supports can have chamfers for encompassing the long sides. The chamfers can preferably have attachment segments that can be engaged with the projections. A mounting extension can be provided on the chamfers, particularly at an angle of 45°, whereby this mounting extension extends in the direction of the opposing long side. The bend can form a mounting extension.

The shelf covering according to the invention is particularly suitable for use with a circulating rack. In addition, the covering of other storage or rack systems, such as storage lifts, for example, is also possible. The covering has a plurality of posts or supports, as a rule, four, or also six or more posts or supports for combined shelves or racking systems, and can additionally have intermediate posts for stabilising or bridging longer pieces of racking. Plates or wall panels arranged between the posts or supports are additionally provided, whereby a sheathing of the racking sides is accomplished by means of these plates or wall panels. While in most cases the wall panels are formed from metal sheets, other laminar materials, for example, made of special plastics, can however be used as the covering, depending on the respective safety requirements. The covering according to the invention is characterised in that the supports (particularly C, L or U-profiles) have angled long sides with a multiplicity of projections uniformly spaced thereupon. The ends of the wall panels facing the supports moreover have chamfers that enclose the side pieces of the profiles. The chamfers thereby have particularly an angle of 90° to the main surface or to the outer wall segment of the plates or wall panels, so that the wall panels extend away from the side pieces at a right angle when the side pieces are encompassed. On their surfaces located on the long side of the side piece, the chamfers have attachment segments developed as recesses that can be engaged with the projections on the long sides. During the assembly of the covering, the wall panels are placed onto the supports that have, as a rule, already been mounted and the attachment segments are latched with the projections or engaged with these in the manner of a snap-on connection. The assembly takes place hereby without the use of tools and without screws. During the dismantling, the entire wall panel can, after the separation of the top-most or a first latching connection, for example, with a special wedge-like tool, be separated from the covering in the manner of a zip fastening, as a result of which the dismantling times are considerably reduced.

It is seen as especially advantageous in this connection if the supports form the support posts of the circulating rack. In this case, no separate supports are used and instead the support posts already have appropriately angled long sides. In addition, a connection, for example, a screw or welded joint, is conceivable between profiles and support posts. Naturally, however, separate side pieces as described above can be attached to the support posts, whereby these side pieces are enclosed by the chamfers.

This development of the connection between wall panels and supports proves to be especially resistant to the impact of falling loads when compared to conventional screw or rivet joints. In this case, unlike with conventional screw or rivet joints, there is no tearing out of the connection points, and instead there is only a plastic stress on the wall panels or chamfers. The entire force that arises is absorbed in this way. Additional bends, particularly at an angle of 45°, are provided on the chamfers, whereby these bends extend in the direction of the long side of the side piece opposite the support and form mounting extensions. The bends of the chamfers encompassing the side pieces of the panels arranged on the supports can preferably form holders. The initial result of these bends is that the wall panels can be easily placed onto the supports without tilting in the process. During the placement of the wall panels, the bends, in interaction with the supports, produce a slight bending of the chamfers so that these slide on to the long sides and the projections arranged thereupon. The chamfers then spring back into their initial positions. As a result, the attachment segments engage with the projections and latch the wall panels to the supports in an especially stable manner. The bends additionally close off the interior of the respective support profile and consequently form an edge closing in the manner of a sheathing.

If lines are run in the profile, the bend simultaneously acts as protection against damage to them. It is also advantageous in this connection if the bend forms a gap with the similarly shaped bend of the wall panels arranged opposite on the same support. This gap can be used as a retainer for a corner sheathing or protective covering that can be slipped or screwed on. It is, however, also possible to use the gap for laying lines, for example, cables or the like, in the interior of the support profile at a later time.

The main surfaces or outer wall segments of the wall panels are spaced at a distance to the supports. In the case of a wall panel impact, these bend away from the rack body. Due to the spacing, the chamfers linked laterally to the wall panels are simultaneously bent towards the side pieces with the impact. The attachment segments are thereby slid further onto the projections and the latching is secured.

The introduced covering proves to be superior to conventional coverings. Due to the covering, greater forces can be absorbed without the user of the storage rack being endangered by falling covering components. The assembly of the covering is additionally simplified and the assembly times and costs are reduced.

In order to stiffen the wall panels of the racking system and in order to guide the wall panels during the placement on the covering, a chamfer or bend of the long sides of the wall panels towards the rack body is provided. This is thereby cut out in such a way that it lies on the outer side of a side piece.

According to a further advantageous embodiment, a corner sheathing or protective cover can be provided for coverings. The corner sheathing or protective cover is thereby particularly suitable for covering the corner areas of coverings as described above. The protective cover can be formed as a strip with projecting connection elements. These can preferably engage behind holders that are arranged between the side pieces of a post or support of a rack covering formed as a profile. The protective cover can be mounted to the support in this way. All strips or tracks mounted in or on the support or formed or put onto the support or the support post of a rack can be considered as a holder. It is seen as particularly advantageous if the holders are formed, as described in the preceding, by means of bends on the chamfers of plates or wall panels encompassing the side pieces. For example, the bends of two wall panels arranged on opposite side pieces of the supports hereby form a gap that serves as a retainer for the projecting connection elements, e.g., of expanding rivets. The connector can preferably be formed as an expanding rivet.

The connection elements or connectors are preferably formed as clip-on or snap-on connectors. In this embodiment, the protective cover can be repeatedly separated from the covering and replaced again, without causing wear on the connection elements. The snap-on connectors thereby have, for example, two parallel side pieces that are manufactured from an elastically formable material that is softer than that of the protective cover. The side pieces can additionally have rounded heads that simplify the placement and removal. A two-part execution of the connection is additionally also conceivable, whereby a first retainer is introduced into the gap where it then remains. The inner edges are rounded off by the retainer. A contact element arranged on the strip can consequently be repeatedly engaged with the retainer without wearing.

A preferred embodiment of the corner sheathing or protective cover provides for the strip to be formed of plastic or metal. It is furthermore deemed to be advisable if the contact elements or connectors are made of plastic or metal. It is thereby possible to manufacture the strip and contact elements as one workpiece, for example, in an extrusion or injection moulding procedure, or to place, for example, to glue, solder or weld, the connection elements onto the strip at a later time. Depending on the desired durability and depending on the estimated costs, the use of plastic or metal for both the strip and the connection elements or connectors is suitable.

In the following, the invention is explained using an embodiment with reference to the figures by way of example. The described embodiment here only represents one possible design that can be modified for the respective application. Individual features that are advantageous in themselves can be added or left out according to the above description of the advantageous designs of the described embodiment.

Figure 2:
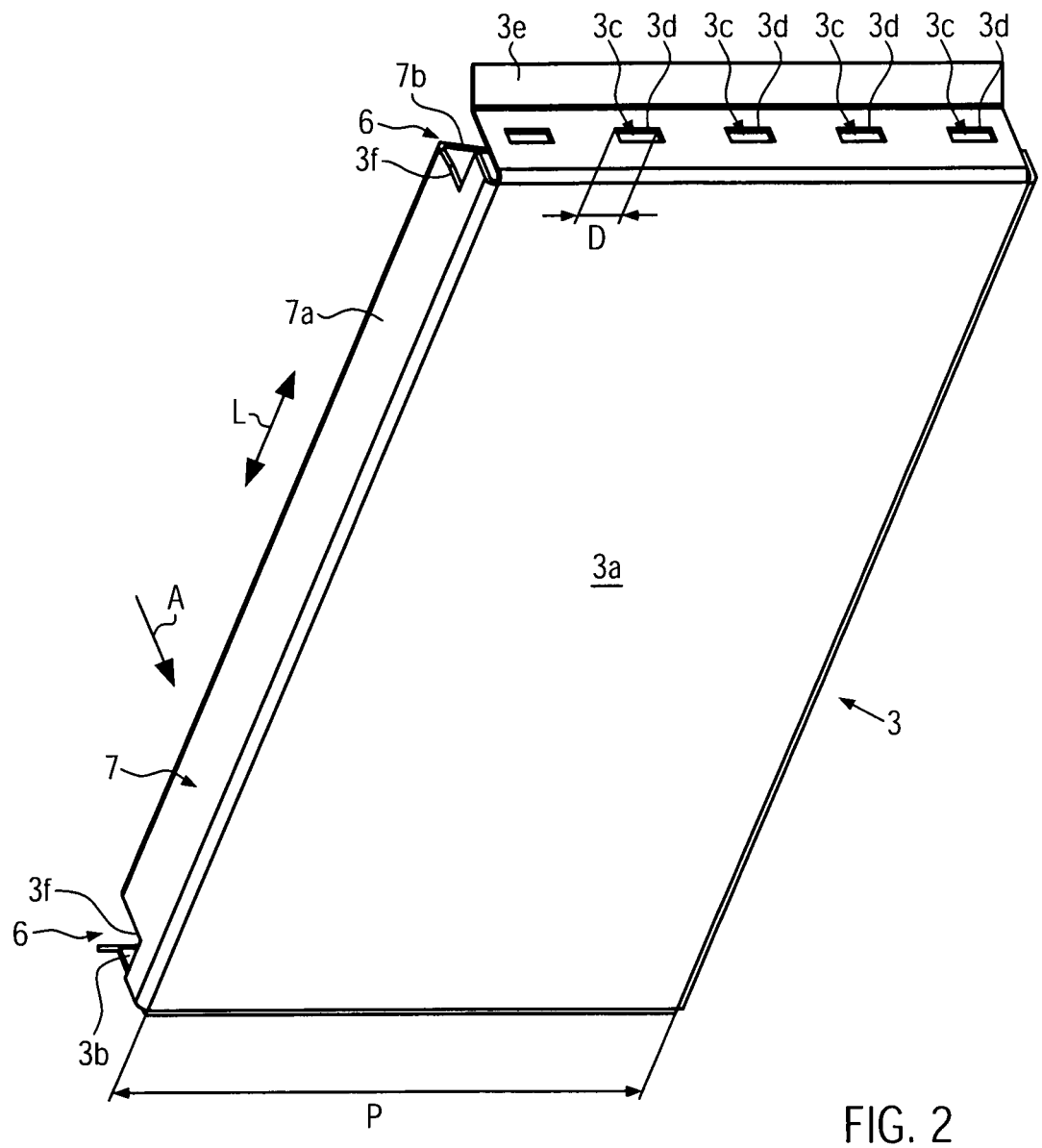
Figure 3:
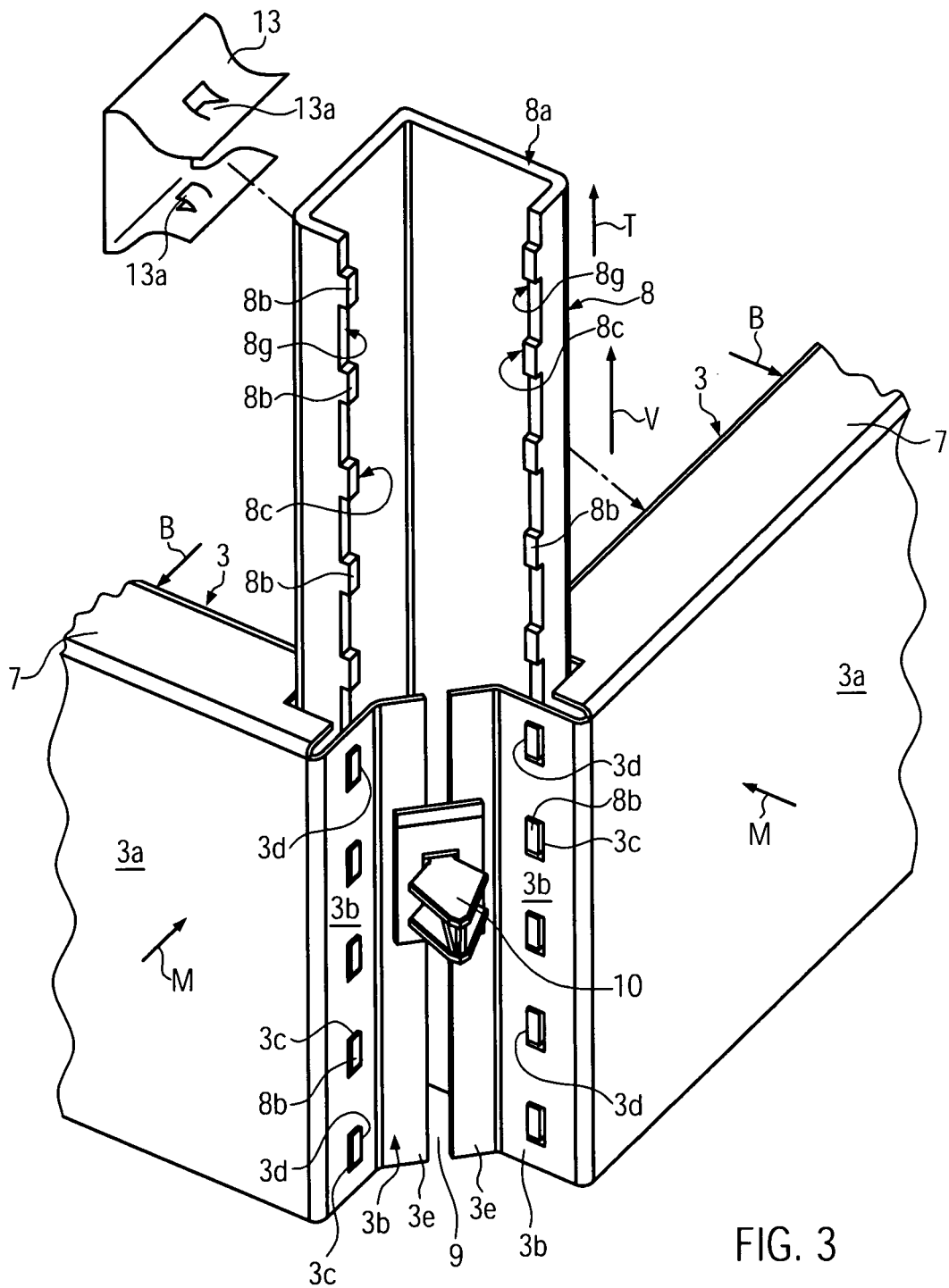
Figure 4:
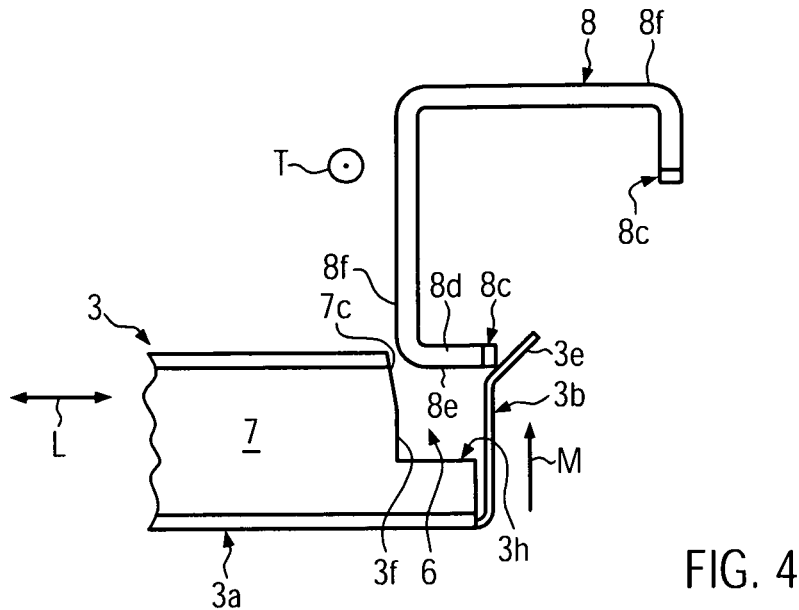
Figure 5:
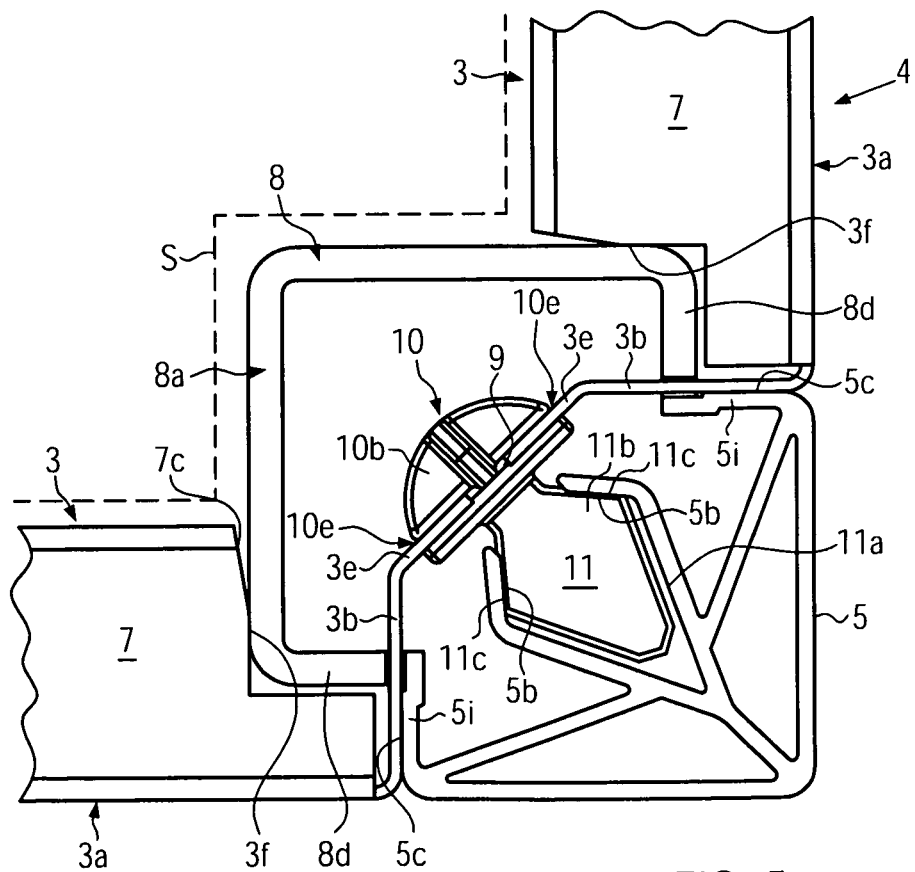
Figure 6:
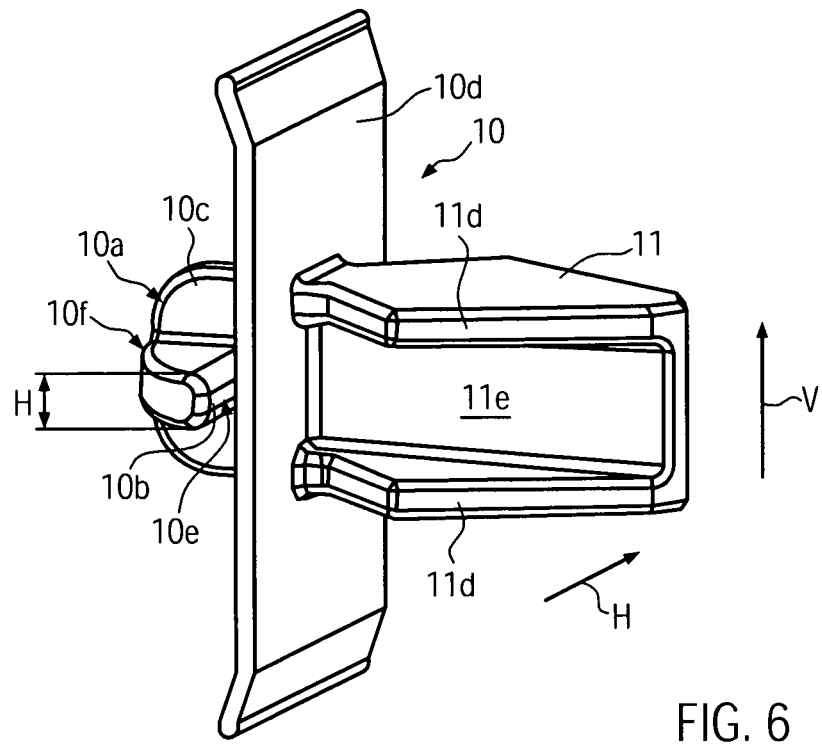
Figure 7:
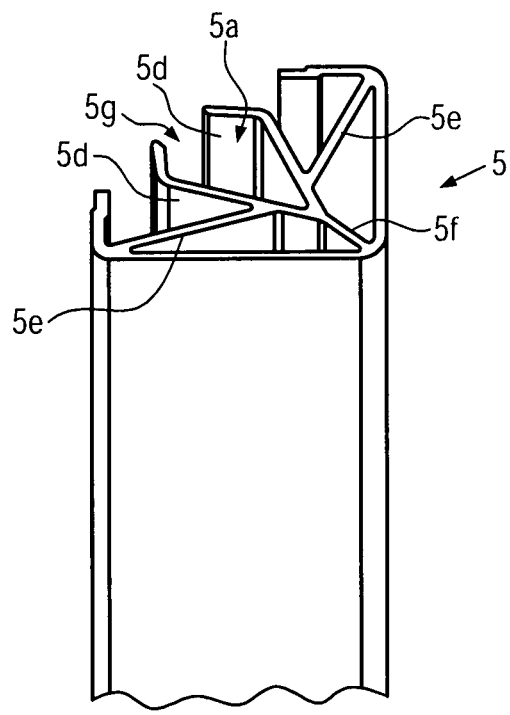
Figure 8:
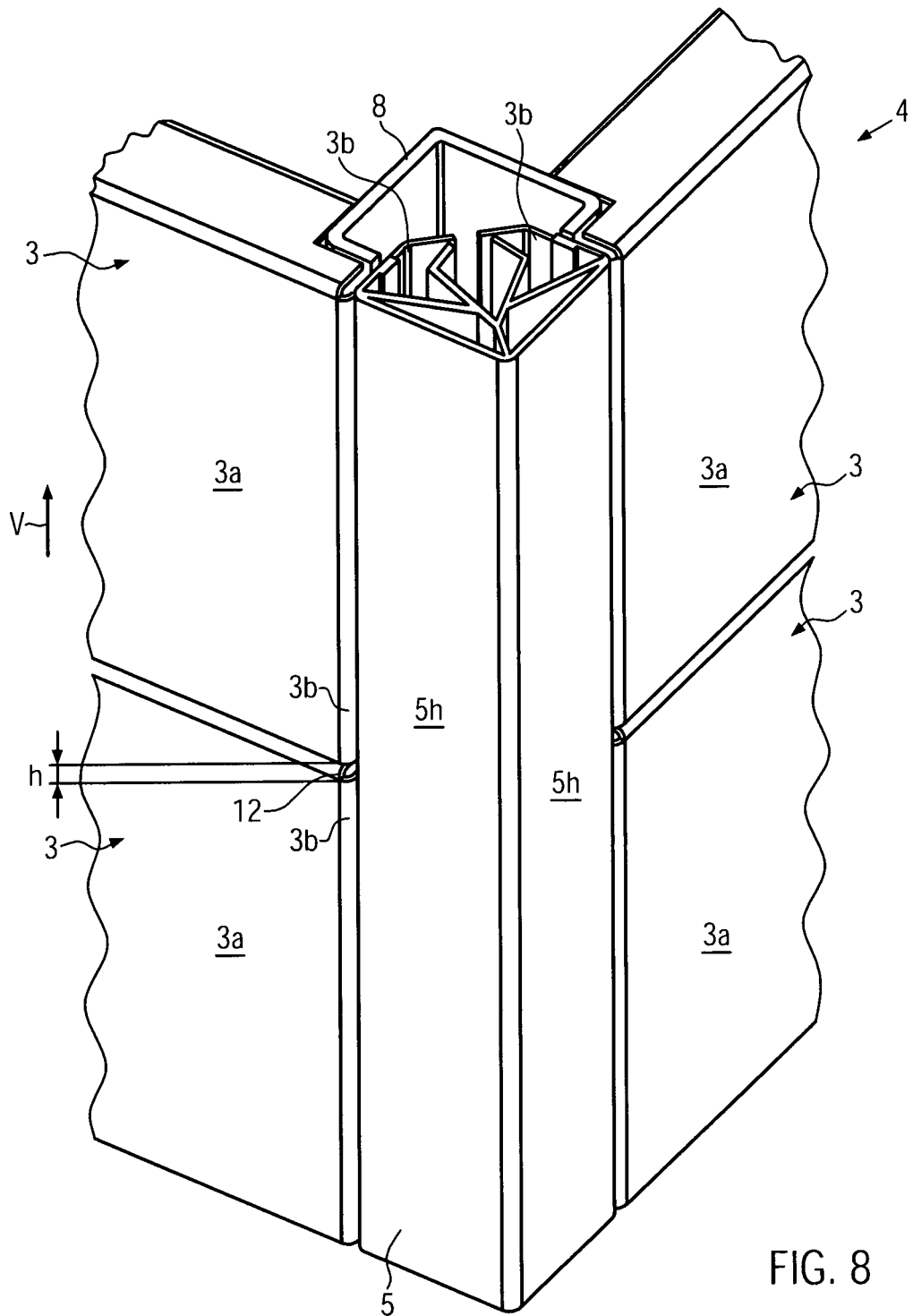
Figure 9A:
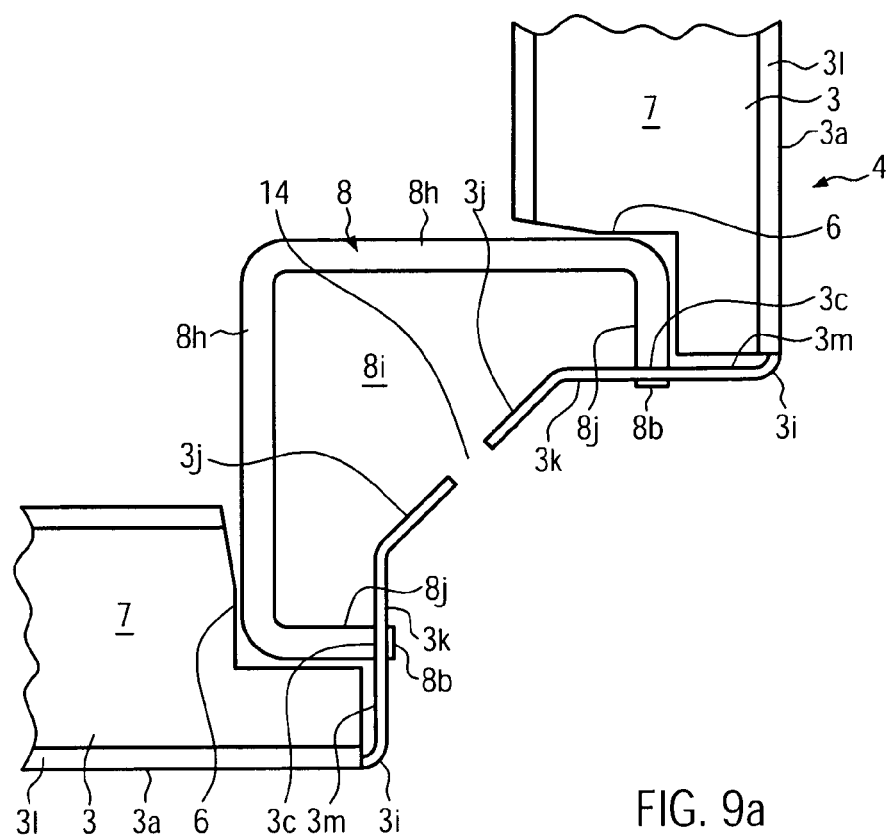
Figure 9B:
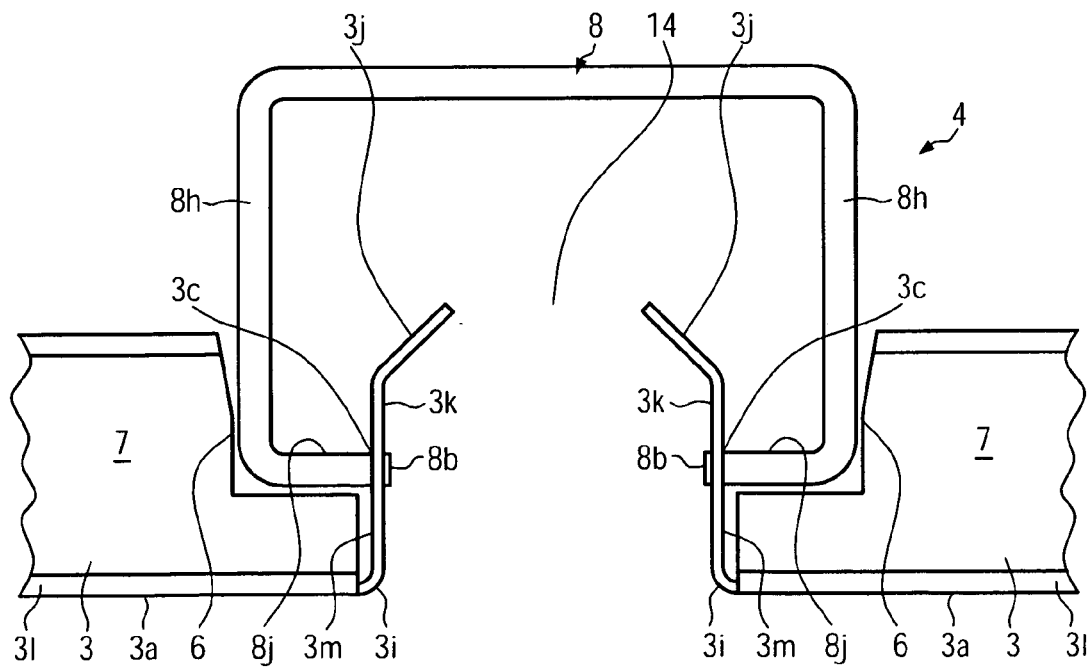
Figure 9C:
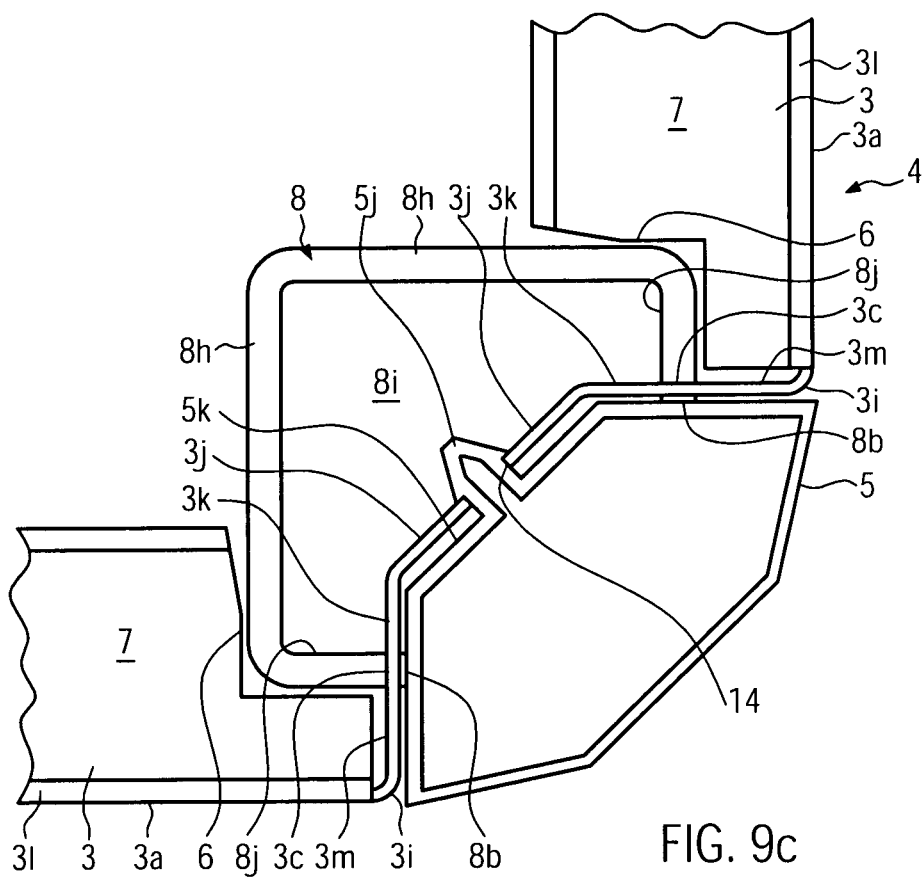
Figure 10:
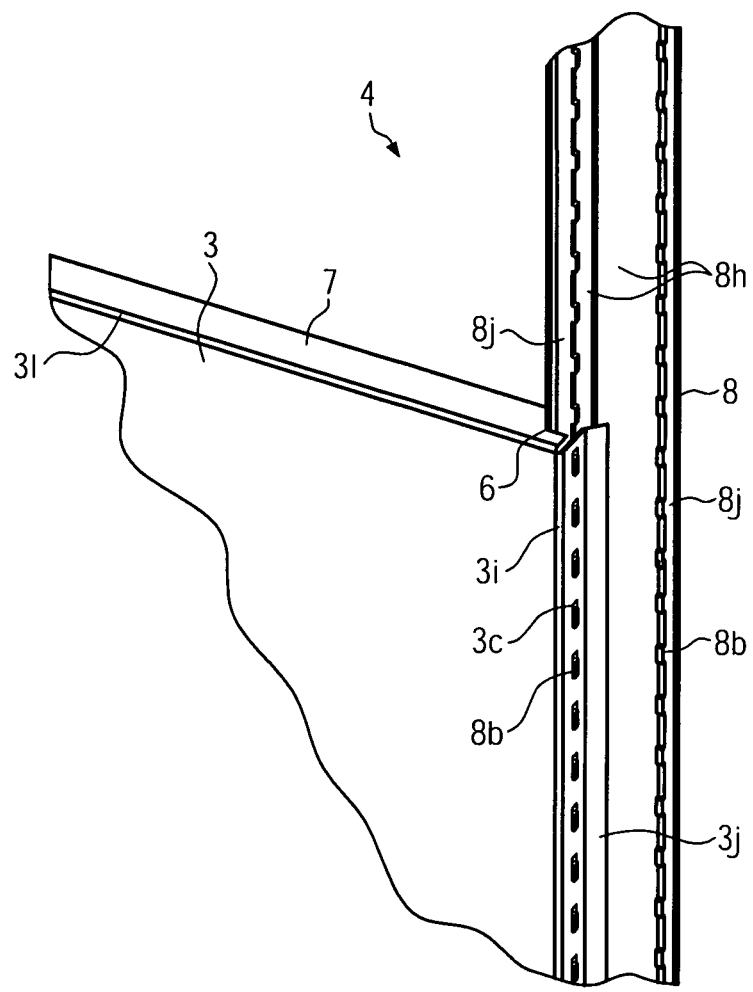

Shown are:

FIG. 1 a schematic perspective view of an automatic storage system according to the invention;

FIG. 2 a schematic perspective view of a wall panel according to the invention;

FIG. 3 a schematic perspective view of a support with two assembled wall panels;

FIG. 4 a schematic top view of a support with a wall panel during the assembly procedure;

FIG. 5 a schematic top view of a detail of an assembled covering;

FIG. 6 a schematic perspective view on to a mounting element;

FIG. 7 a schematic perspective view on to a protective cover;

FIG. 8 a schematic perspective view of a detail of an assembled covering;

FIG. 9a a detailed view of a preferred embodiment of a covering according to the invention;

FIG. 9b a detailed view of a further embodiment of the covering;

FIG. 9c the detailed view of the covering from FIG. 1a with the protective cover attached, each in a top view;

FIG. 10 a detailed view of the covering in a perspective depiction, and

Figure 11:
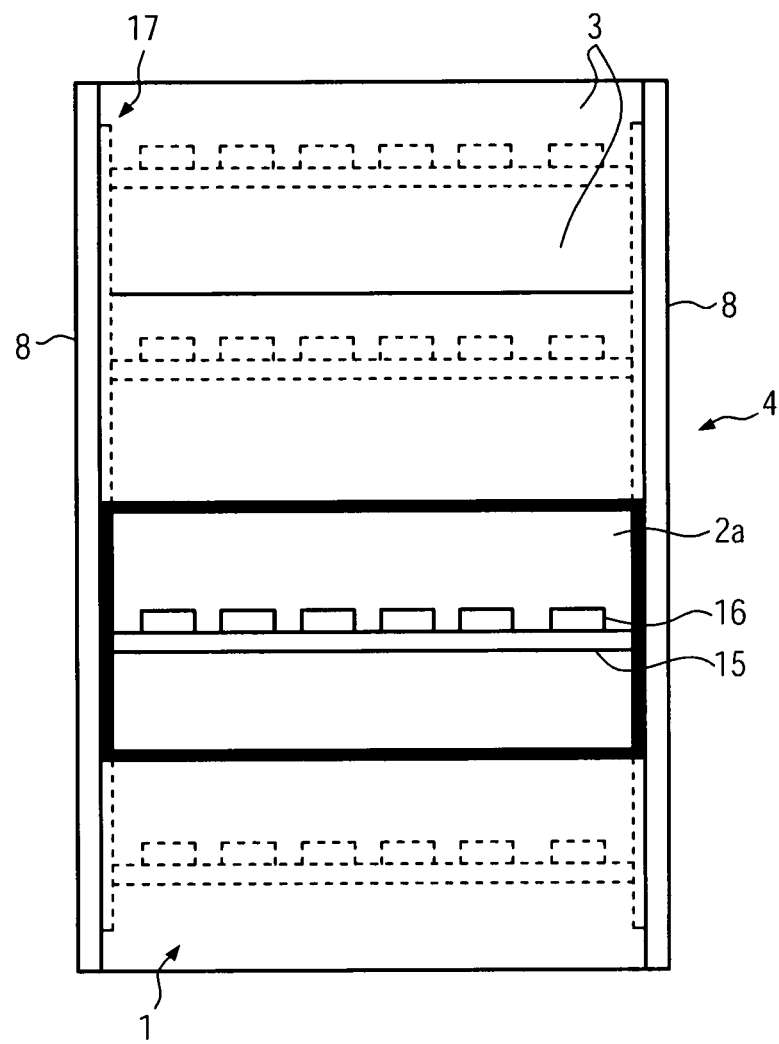

FIG. 11 an embodiment of a circulating rack given the covering, in a front view.

First the configuration of a storage system according to the invention is explained with reference to FIG. 1, which shows by way of example an automatic storage system 1 with two removal consoles 2. The storage system 1 can be designed as a paternoster storage system or storage lift, or as a storage system with a crane that can be driven in a storage aisle.

The storage system 1 is preferably covered across its entire height in a vertical direction V with wall panels 3 according to the invention. The wall panels 3 form a covering 4 of the storage interior with a support structure that is covered here, for example, one that is formed by supports. Outer wall segments 3a of the wall panels 3 form an outer wall surface 1a of the storage system 1. The cover that closes off the storage system 1 at the top in the vertical direction V can also be formed by wall panels 3. Wall panels 3, adjoining the removal consoles 2 above and below the removal consoles 2, can have a reduced height in the vertical direction V by means of which the dimensions of the covering are adapted to the dimensions of the removal consoles 2. The wall panels 3 arranged on the ends of the storage system 1 facing in the vertical direction V also are designed so that they are shorter in the vertical direction V in the depicted embodiment in order to adapt the total height of the covering 4 to the stipulated height of the storage system 1. The wall panels 3 are latched to the support structure that holds them, preferably by being pressed onto the support structure from the outside.

Protective covers 5 are attached at the corners between the outer surfaces of the covering 4, whereby these protective covers 5 cover side areas of the wall panels 3 arranged thereunder. Wall panels 3 that are adjacent to one another in a horizontal direction H or in a direction running transverse to the vertical direction V are attached jointly to supports, which are not shown here, by means of attachment segments. The protective covers 5 that are attached to the supports with a positive fit support the side areas of adjacent wall panels with respect to one another and consequently secure the positive-fitting connections between the wall panels 3 and the supports arranged between adjacent wall panels 3.

FIG. 2 shows a perspective view of a wall panel 3. The wall panel 3 forms an outer wall segment 3a, from which the outer wall of the covering is formed in the assembled state of the storage system. In the assembled state of the covering, the outer wall segment 3a preferably faces outwards, i.e., away from the storage volume of the storage system 1. Side areas 3b are arranged on opposite ends of the outer wall segment 3a. The side areas 3b that lie opposite to one another with regard to the outer wall segment 3a are constructed symmetrically to one another and are formed by a chamfered tab. The wall panel is preferably formed by a metal sheet that is bent or deep-drawn for the manufacture of the side areas 3b.

The wall panel 3a is furthermore given attachment segments 3c that are designed as rectangular openings in the side area 3b. The attachment segments 3c form latching elements that can be latched to latching elements designed as extensions on the supports of the storage system. In the attachment segments 3c designed as openings, mounting surfaces 3d are arranged that face outwards in a direction A, i.e., away from the storage volume S shown in FIG. 5 and that hold the wall panel 3 on the support when the wall panel 3 has been assembled. Each of the mounting surfaces 3d is formed by a long side of an attachment segment 3c that is substantially rectangular. The mounting surfaces 3d have a predetermined height D and are provided in a predetermined number, whereby the number of mounting surfaces and their height D are dimensioned in such a way that the sum of the height D of all mounting surfaces of a side area 3b is greater than a third of the height P of the outer wall segment 3a or the total height of the wall panel 3. In the depicted embodiment, five attachment segments 3c are arranged on a side area 3b in each case. More than five attachment segments 3c can alternatively be provided.

The attachment segments of the wall panels 3 can be developed as oval or round openings as an alternative to rectangle-shaped openings. Attachment segments formed as extensions can furthermore be provided. In the case of a wall panel manufactured from a metal sheet, the attachment segments formed as extensions can be formed from stamped and subsequently angled sheet metal tabs.

A mounting extension 3e is provided on a side of the side area 3b facing away from the outer wall segment 3a, whereby the mounting extension 3e extends diagonally away from the outer wall segment 3a. The mounting extensions 3e of two wall panels 3 that are adjacent when assembled form a retainer for attaching a mounting element, which is shown in FIGS. 3, 5 and 6. At the same time, the mounting extensions 3e form guide or assembly bevels of the side areas 3b that simplify the placement and latching of the wall panels 3 on to the support structure of the storage system 1.

The side segments 3b lie opposite support surfaces 3f in a longitudinal direction L that runs in the opposing direction of or parallel to the outer wall segment, whereby these, together with the side areas 3b, form a recess 6 for retaining a support.

The wall panel 3 is provided at the edge with stiffeners 7 transverse to the longitudinal direction L. The stiffeners 7 are formed from a two-way chamfer and comprise, in addition to a segment 7a running transverse to the outer wall segment 3a and connecting to the outer wall segment 3a, a segment 7b that runs parallel to the outer wall segment 3a. The side area 3b is spaced at a distance from the segment 7a of the stiffener 7 running transverse to the outer wall segment 3a transverse to the longitudinal direction L or parallel to the outer wall segment 3a so that when the covering is assembled a gap remains between two wall panels, whereby a mounting element can be inserted into the gap.

FIG. 3 shows a perspective view of a support 8 with two wall panels 3 assembled on the support 8. The support 8 is provided with a substantially C-shaped cross-section 8a in a projection direction that corresponds to the vertical direction V, whereby a multiplicity of mounting segments 8b are arranged on the opposing ends 8g of the C-shaped cross-section 8a. A multiplicity of mounting segments 8b are provided on each of the opposing ends 8g of the C-shaped cross-section, whereby these mounting segments 8b are arranged in a row, one behind the other, in a longitudinal direction of the support or in the vertical direction V. The mounting segments 8b are developed as rectangular extensions, each of which extends away from the support 8, parallel to the outer wall surface of an assigned wall panel.

The side segments 3b of the wall panels 3 project into the support 8, whereby the flatly formed mounting extensions 3e lie in a common plane within the support 8. A slot-shaped retainer 9 remains between two mounting extensions 3e of two wall panels 3 that are adjacent transverse to the longitudinal extension T of the support 8 in the assembled state of the wall panels 3. A mounting element 10 is retained by the slot-shaped retainer 9 formed by the side areas 3b, whereby the mounting element 10 forms a positive locking with the mounting extensions 3e. Due to the positive fit connection between the mounting element 10 and the mounting extensions 3e, unintentional separation of the latching connection between the wall panels 3 and the support 8 is prevented.

The positive fit connection between the wall panels 3 and the support 8 is produced by means of the attachment segments 3c and mounting segments 8b, which are latched to one another in the assembled state. Each mounting segment 8b of the support 8 latches with an attachment segment 3c of a wall panel 3. The outward facing mounting surfaces 3d of the wall panels 3 lie on inwardly facing mounting surfaces 8c of the mounting segments 8b of the support 8 in the latched state. The mounting surfaces 8c of the support 8 consequently form opposing surfaces with respect to the mounting surfaces 3d of the wall panels 3.

The wall panels 3 are placed onto the support 8, each in an assembly direction M that runs perpendicular to the wall outer surface 3a, from the outside for the assembly of the latching connection. Due to the assembly bevels formed by the mounting extensions 3e, the side areas 3b glide over the mounting segments 8b until attachment segments 3c of the wall panels 3 are flush with the mounting segments 8b of the support 8; then the wall panels 3 automatically latch in and their assembly is complete, as far as other mounting elements and edge covers are not used. The wall panels 3 can consequently be attached to a support structure, formed by the supports 8, of the storage system 1 without tools.

In order to connect wall panels 3 that are arranged one above the other in a vertical direction V directly to one another, spring clips 13 can be provided that are slid onto adjoining stiffeners 7. The wall panels 3 can consequently be stiffened and natural oscillations of the wall panels 3 can be reduced. The spring clips 13 can have notches 13a which engage behind the wall panels 3 or their stiffeners 7 at least in segments and therefore prevent unintentional separation of the spring clips 13.

Due to the angle between the side areas 3b and the outer wall segments 3a, it is ensured, even in the case of a deformation of the wall panels 3 caused by storage goods impacting against the wall panels 3 from the inside, that the wall panels 3 do not separate from the support 8. Even in the case of a load acting from the inside on the wall panels 3 in a direction of loading B, for example, due to storage goods falling out, the wall panels 3 cannot separate from the support 8 because the load acting from the inside is completely absorbed by the pairing of the mounting surfaces 3d and 8c facing in or opposite to the direction of loading B.

The segment of the support 8 on which the mounting surfaces 3d of the wall panels 3 lie is arranged between the side areas 3b. The side areas 3 or the mounting surfaces 3d can consequently engage behind each of the assigned supports 8 of the storage system in the assembled state of the wall panels 3. The mounting surfaces 3d are furthermore substantially rigidly connected to the outer wall segment 3a. Should slipping or falling storage goods strike the outer wall segment from the inside or from the storage volume, for example, in the direction B, and if the outer wall segment is bent outwards as a result of this, the mounting surfaces 3d that are substantially rigidly connected to the outer wall segment 3a, together with the adjoining areas of the outer wall segment, are twisted with respect to the support 8. At the same time, bending of the outer wall segment 3a can lead to a shortening of the distance between opposing side areas 3b of a wall panel 3. Due to the supports 8 arranged between the side areas, such a deformation of the outer wall segment leads to a pressing of the side areas 3b to the supports 8 and consequently to a strengthening of the connection between the wall panels 3 and supports 8.

FIG. 4 shows a wall panel 3 and a support 8 in a pre-assembled state. The wall panel 3 is pressed onto the support 8 in an assembly direction M transverse to the wall outer surface 3a of the wall panel 3 or transverse to the longitudinal extension of the support 8. The mounting extension 3e of the wall panel 3 forms, with a bevel 7c of the stiffener 7 of the support arranged opposite with respect to the recess 6, a substantially funnel-shaped profile in the longitudinal direction T of the support, which simplifies the placement of the wall panel 3 onto the support 8.

During the assembly of the wall panel 3, the side area 3b is elastically deflected in a longitudinal direction L of the wall panel 3 until a side area 8d of the support 8 that runs parallel to the wall outer surface 3a can be inserted into the retainer 6 of the wall panel 3. In order to make the assembly of the wall panel 3 even simpler, an assembly position can be given by a blocking surface 8e of the support 8 and a blocking surface 3h of the wall panel 3, whereby in this position, the attachment segments 3c and the mounting segments 8b latch into one another. The assembly position can correspond to a position in which the blocking surface 8e of the support 8 and the blocking surface 3h of the wall panel 3 lie on one another.

The support 8 is equipped with support surfaces 8f on its outer circumference, whereby these support surfaces 8f lie on the support surfaces 3f of the wall panels 3 when the wall panels 3 have been assembled and are arranged substantially in attachment segments of the wall panels 3 that are located opposite in the longitudinal direction L and opposite the mounting segments 8c of the support 8.

FIG. 5 is a top view of a support 8 with two assembled wall panels 3. The support structure of the storage system formed by the supports 8 and the covering 4 formed by the supports 8 and wall panels 3 enclose a storage volume S that is represented schematically by a dashed line. A mounting element 10 is slid into one of the slot-shaped retainers 9 formed by the side areas 3b of the wall panels 3. The mounting element 10 forms slot-shaped retainers 10e for the mounting extensions 3e of the wall panels 3 and consequently a positive-fit connection between the inserted side areas 3b. The slot-shaped retainers 10e are developed as undercuts in a mounting segment 10b of the mounting element 10.

A latching extension 11 is arranged between the side areas 8d of the support 8, whereby this latching extension 11 is formed by the mounting element 10 and extends out of the C-shaped cross-section 8a of the support 8 in the assembled state. The latching extension 11 is inserted into a latching retainer 5a of the protective cover 5. The latching extension 11 is substantially conically formed. In the direction of the support 8, a mounting segment 11b connects to a wedge-shaped segment 11a that extends away from the support 8, whereby this mounting segment 11b tapers in the direction of the support 8. The mounting segment 11b forms mounting surfaces 11c that run diagonally towards one another in the direction of the support 8. In the assembled state of the protective cover, the mounting surfaces 11c of the latching extension 11 lie on the mounting surfaces 5b of the protective cover 5. The protective cover 5 is consequently held in a positive-fit between the opposing side areas 3b of two adjacent wall panels. Support segments 5i of the protective cover 5 support the side areas 3b of the wall panels 3. Support surfaces 5c of the protective cover 5 arranged on the support segments lie flat on the opposing side areas 3b and consequently support the side areas 3b against one another.

In order to make it possible to insert the mounting extensions 3e of the adjacent wall panels 3 into the slot-shaped retainers 10e arranged on a common plane, an angle of roughly 135° is provided between the areas of the side area 3b that comprise the attachment segments and that run perpendicular to the outer wall segment 3a and the mounting extensions 3e.

FIG. 6 is a schematic perspective view of a mounting element 10. The mounting element 10 comprises a mounting device 10a provided with a cross-shaped cross-section or with a cross-shaped profile 10f, whereby the mounting element 10a can be inserted between four adjoining wall panels. A mounting segment 10b running transverse to the longitudinal extension L of a support has a height H that is somewhat less than the width of one between side areas 3b of two adjacent wall panels 3 in a vertical direction V. A guide segment 10c running transverse to the mounting segment 10b, on the other hand, is somewhat narrower than the width remaining in a horizontal direction H between two side areas 3b, shown in FIG. 5 as a retainer 9 developed as a slot. Mounting element 10 can consequently also be inserted into a crossed slot when the wall panels have been assembled, whereby the crossed slot remains between four adjoining wall panels.

After the insertion of the mounting element 10 into the crossed slot formed by four adjoining wall panels, this is slid in a vertical direction V upwards or downwards so that the mounting segment 10b reaches behind the side areas 3b and is held by these in a positive fit. A support device 10d arranged opposite the mounting segment 10b with regard to the side areas 3b in the assembled state that remains in the assembled state on the outward facing surfaces of the side areas 3b or of the mounting extensions 3e forms a counter-hold thereby. The support device 10d is elastically deformable and consequently generates a spring-elastic force that produces a frictionally-engaged connection between the support device 10d and the side areas 3b and/or between the mounting segment 10b and the side areas 3b. In order to increase the spring-elastic deformability of the support device 10d, it is on the whole substantially shaped like a curve, whereby ends of the curve situated opposite one another in the vertical direction V rest on the side areas 3b. The latching extension 11 is arranged on the side of the support device 10d facing away from the side areas 3b. The latching extension 11 is an integral component of the mounting element 10. The mounting element 10 is preferably cast in one piece from plastic.

The latching extension 11 comprises two notches 11d arranged parallel to each other in the vertical direction V and connected to each other by means of connection segment 11e developed across from the notches 11d.

FIG. 7 shows a perspective partial view of a protective cover 5. The protective cover 5 is formed from a profile body that is formed to be elastically expandable in order to allow an expansion of the latching retainer 5a having clamping jaws during the joining of the latching connection between the mounting element 10 and the protective cover 5. To reduce the rigidity of the latching retainer 5a, the side walls 5d of the latching retainer 5a are arranged in a self-supporting manner across the greater portion of their length. The support walls 5e and 5f that stiffen the profile 5 are positioned on a side of the latching retainer 5a facing away from the opening 5g so that the elasticity of the latching retainer 5a is preserved in spite of a stiffening of the protective cover 5.

FIG. 8 shows a partial view of an assembled covering 4. A total of four wall panels 3 are latched to a support 8. The side areas 3b of the wall panels 3, which here are placed onto not shown side areas 8d of the support 8, are secured by means of at least two mounting elements 10, each of which is assigned to a pair of wall panels 3. The protective cover 5 latched to the mounting elements also secures the wall panel 3 in that it rests on the side areas 3b and prevents a separation of the side areas 3b from the side areas of the support.

The protective cover 5 forms an edge profile with outer surfaces 5h. The outer surfaces 5h of the protective cover 5 lie flush with the surfaces of the outer wall segments 3a. In this way, projections are avoided on the outer surface of the storage system that could cause vehicles or objects moved past the storage system to get caught.

In the assembled state of the wall panels 3, a gap 12, having a height h, remains between the side areas 3b adjacent in the vertical direction V. The height h is somewhat greater than the height h of the mounting segment 10b of the mounting element 10 shown in FIG. 6 and consequently allows the mounting device 10a to be slid in between four wall panels 3 adjacent in a vertical direction V.

In addition to the shown embodiment of a storage system, further advantageous embodiments are possible in the sense of the invention. For example, other types of storage systems, for example, storage lifts, can also be developed according to the invention instead of the shown paternoster storage system.

FIG. 9a shows a further preferred embodiment of a covering 4 in a top view, whereby the same reference numbers are used for elements that correspond in function and construction to the elements of the embodiments of FIGS. 1 to 8. Shown is a post or support 8 of the rack covering 4 with wall panels 3, especially made of sheet steel, arranged on the support 8. The covering 4 usually comprises four corresponding supports 8 on its four corners, but in the case of rack systems that have been put together (not shown), however, there can also be six or more supports 8. It is also conceivable, however, that the covering 4 has only two supports 8 and is otherwise placed at a wall, whereby only the front side of a storage rack is covered with the wall panels 3. The wall panels 3 in the embodiment of FIG. 1 are metal sheets with which the rack sides are covered and by means of which the storage goods 16 (cf. FIG. 11) are simultaneously prevented from falling out of a circulating rack 1. The covering 4 in the embodiment has posts or supports 8 that are formed as C- or L-profiles with two side pieces 8h arranged at an angle of 90°. Smaller or larger angles are naturally also conceivable here, as far as there is no impairment of the stability of the covering 4. The side pieces 8h border the interior 8i of the support 8 and additionally have long sides 8j angled toward the interior 8i. A multiplicity of uniformly spaced, tooth-like projections or mounting segments 8b are formed on these long sides 8j, whereby these projections or mounting segments 8b form the mounting segments 8b (cf. FIG. 10). Two wall panels 3 extend away from the support 8, whereby the ends 3m of these wall panels 3 facing the support 8 have chamfers 3i. These enclose the side pieces 8h.

In the embodiment, the chamfers 3i have an angle of 90° to the outer wall segments 3a of the wall panels 3 and, in the assembled state, extend at a right angle to the post or support interiors 8i. Attachment segments 3c in the form of recesses are introduced (e.g., by stamping or laser cutting) into the chamfers 3i in their surfaces 3k resting on the long side 8j of the side piece 8h that can be engaged with the mounting segments 8b provided on the angled long sides 8j of the supports 8. During the assembly of the covering 4, the wall panels 3 are inserted onto the upright supports 8 and put on over the long sides 8j of the supports 8. The mounting segments 8b developed as projections thereby latch into the attachment segments 3c and connect the wall panels 3 and supports 8 without the use of screws or other attachment elements. The simple "threading" of the plates or wall panels 3, meaning the engaging of the mounting segments 8b of the supports 8 and the recesses or attachment segments 3c into the chamfers 3i, is possible due to the additional bend 3j of the chamfers 3i. In the embodiment of FIG. 1a, the bend 3j has an angle of 45°. The bend 3j extends in the direction of the long side 8j of the side piece 8h positioned opposite the support 8. When the wall panels 3 are placed onto the support 8, the bend 3j first glides onto the long side 8j of the support 8 and thereby brings about a slight bending of the chamfer 3i. As a result, this can be slid over the mounting segment 8b and then spring back into its original position. The mounting segments 8b are thereby latched to the attachment segments 3c.

Due to the bend 3j, the interior 8i of the support 8 bordered by the side pieces 8h is virtually closed. The bend 3j, with the similarly shaped bend 3j of the wall panel 3 arranged opposite the support 8, forms a gap 14 that serves as a retainer for a corner sheathing or protective cover 5 that can be put on (cf. FIG. 1c). For dismantlement of the wall panels 3, each wall panel 3 can be separated from the support 8 in the manner of a zip fastener as soon as a first attachment segment 3c has been separated from the engaged mounting segment 8b.

In the covering 4 shown in FIG. 9a, the wall panels 3 have a right-angled bend on their upper edges 3l, whereby the bend forms a stiffener 7 that has a retainer 6 in the area of the support 8. The outer wall segment 3a of the wall panels 3 is additionally arranged at a distance to the support 8. In this way, the assembly of the wall panels 3 is simplified because the wall panels 3 can be more easily placed onto the supports 8 and more simply latched to the projections or mounting segments 8b. In the case of an impact at the wall panels 3, the offset wall panels 3 furthermore prevent the latched attachment segments 3c from separating from the projections or mounting segments 8b due to the bending of the wall panels 3. The arrangement and development of the connection between the wall panels 3 and supports 8 has proven to be especially resistant to an impact at the covering 4, for example, due to storage goods 16 falling out of the racks or the storage goods carriers 15 (cf. FIG. 3). The result of the storage goods 16 landing on the covering 4 here is a plastic deformation of the wall panels 3 and of the chamfer 3i, as a result of which the entire energy is absorbed. Due to the offset arrangement of the wall panels to the supports 8 on the front side of the covering 4, the attachment segments 3c are slid further onto the mounting segments 8b in the event of deformation of the wall panels 3, and a separation of the latching is consequently prevented.

FIG. 9b shows a further embodiment of the present invention, whereby here the bearer or support 8 is executed as a U-profile instead of as a C- or L-profile. The same reference numbers are used for elements that correspond in function and construction to the elements of the embodiments of FIGS. 1 to 9a. The embodiment shown here is consequently suitable for covering a storage rack front or for forming a composite of a plurality of coverings 4 arranged next to one another. Assembly here proceeds as already depicted above, by simply placing the wall panels 3 onto the supports 8 or pulling them over and by the subsequent latching of the attachment segments 3c in the chamfers 3i of the wall panels 3 to the mounting segments 8b on the supports 8. Here again, the bends 3j that extend the chamfers 3i form a gap 14. This gap can be used in order to attach sheathing strips, similar to corner sheathings or protective covers 5 (cf. FIG. 1c), on the storage rack or to lay cables in the area 8i.

FIG. 9c shows a post or support 8 with wall panels 3 put on, whereby the support 8 is additionally covered by a protective cover 5. The protective cover 5 is hereby formed as a track in which connectors 5j for engaging with the gap 14 are formed on the backside 5k facing towards the interior 8i of the support 8. Because the track is manufactured from an elastic material and due to its hollow design, the connectors 5j can be separated from the support 8 without destruction. For assembly, the connectors 5j are introduced through the gap 14 after the track has been positioned, whereby the gap is formed by the bends 3j of two wall panels 3, and the connectors engage behind the bends 3j. The protective cover 5 of the support 8 can consequently be carried out without the use of tools. For dismantlement, the connectors 5*j* are pulled out of the gap 14 without thereby being damaged so that they are consequently reusable.

FIG. 10 shows a further detailed view of a preferred embodiment of the storage rack covering or covering 4 according to the invention without the protective cover 5 in position. The support 8 of the covering 4 can be clearly seen here. Initially arranged on the support 8 in the embodiment is only a wall panel 3. This has a chamfer 3*i* that encompasses a side piece 8*h* of the support 8. The chamfer 3*i* has attachment segments 3*c* that are engaged with mounting segments 8*b* that are arranged on the long sides 8*j* of the side pieces 8*h*. The long sides 8*j* are angled at an angle of 90° to the side piece 8*h* and, because of their development, allow a screwless connection between the wall panel 3 and the support 8. In addition to the chamfer 3*i*, the wall panel 3 has a bend 3*j* that extends to the angled long side 8*j* of the opposite side piece 8*h* of the support 8. This bend 3*j* allows the wall panels 3 to be slid onto the support 8 during the assembly of the wall panels 3. The chamfer 3*i* is hereby splayed open so far that the attachment segments 3*c* can be engaged in the mounting segments 8*b*.

The wall panel 3 furthermore has a bend on its upper edge 3*l*, whereby this bend extends to the interior of the storage rack and forms a stiffener 7. The bend or stiffener has a recess 6 in the area of the support 8 that simplifies the placement of the wall panels 3 onto the support 8 in the manner of a guide. The wall panel 3 in the embodiment of FIG. 2 consists of metal sheet, but the use of wall panels 3 made of a plastic material, for example, GFRP, is also conceivable.

FIG. 11 shows an embodiment of a circulating rack 1 provided with a covering 4. The covering 4 here is formed by a total of three wall panels 3 that are arranged on supports 8. In the case of higher storage racks, usually ten or more such wall panels are provided, one above the other. The circulating rack 1 of FIG. 11 has a removal opening 2*a*, through which an operator (not shown) is given access to the storage goods carrier 15 circulating in the circulating rack 1 in the manner of a paternoster. The storage goods 16 are accelerated as the storage goods carrier 15 circulates and experience centrifugal acceleration at the upper and lower turning point 17 of the circulating rack 1. As a result of this, inadequately secured storage goods 16 can tip over or be ejected from the storage goods carriers 15 and injure the operator of the circulating rack 1. The above-described assembly of the wall panels 3 of the covering 4 guarantees a high resisting power against objects ejected from the circulating rack 1, because there results a plastic deformation of the wall panels 3 and the chamfers 3*i* (cf. FIG. 1) in the manner of a crumple zone, and not however a separation of the latching connection between the wall panels 3 and supports 8.

The introduced covering 4 is consequently advantageous in two regards compared to conventional storage rack coverings 4. Firstly, the covering 4 can be especially easily and quickly assembled due to the screwless connection of the wall panels 3 and supports 8. Secondly, the covering 4 offers improved protection against storage goods 16 falling out of the circulating rack 1, because the forces acting on the covering wall panels 3 can be more effectively absorbed and there is no separation of the wall panels 3 as a result of screw or rivet joints that pull out.

The invention claimed is:

1. Automatic storage system (1) having an automatic storage volume (S) with a paternoster storage system or lift, or a crane that can be driven in a storage aisle that is enclosed at least sectionwise by a covering (4) made of at least two wall panels (3), wherein the wall panels (3) are attached to a support member (8), wherein the wall panels (3) are latched to the support member (8), wherein each of the at least two wall panels (3) includes a side area (3*b*), and the side areas (3*b*) of two adjacent wall panels (3) form a slot-shaped retainer (9) into which a mounting element (10) can be slid, and wherein each of the at least two wall panels (3) is, on opposing sides of an outer wall segment (3*a*) forming an outward facing wall outer surface, provided with two side areas (3*b*) that extend transverse to the outer wall segment (3*a*), each of which has at least one attachment segment (3*c*) integrated into the side areas (3*b*) and each being designed as a latching element with at least one outwardly facing mounting surface (3*d*).

2. Automatic storage system (1) according to claim 1, wherein the at least one attachment segment (3*c*) is formed by an opening extending substantially parallel to the outer wall segment (3*a*).

3. Automatic storage system (1) according to claim 1, wherein the at least one mounting surface (3*d*) of the side area (3*b*) extends in a vertical direction (V) running parallel to the outer wall segment (3*a*) across a total of at least one third of the height (P) of the outer wall segment (3*a*).

4. Automatic storage system (1) according to claim 3, wherein each of the at least two wall panels (3) has support surfaces (3*0* positioned opposite the side areas (3*b*) in a direction running parallel to the outer wall segment (3*a*), wherein the support surfaces (3*f*) form, with the side areas (3*b*), a recess (6) wherein each recess (6) retains a support member (8).

5. Automatic storage system (1) according to claim 1, wherein the support member (8) is configured for constructing a support structure of the storage system (1) that encloses the automatic storage volume (S), and has at least one mounting segment (8*b*) for the attachment of the at least two wall panels (3) and equipped with at least one mounting surface (8*c*) facing in the direction of the storage volume (S) as a latching element.

6. Automatic storage system (5) according to claim 5, wherein the at least one mounting segment (8*b*) is formed by an extension integrated into the support member (8) and extending away from the support member (8) in parallel to the mounting surface (8*c*).

7. Automatic storage system (5) according to claim 5, wherein the support member (8) has a substantially C-shaped cross-section (8*a*) on whose opposing ends (8*g*) the mounting segments (8*b*) are arranged, each for the attachment of at least one wall panel (3).

8. Automatic storage system (1) according to any one of claims 1 and 3 to 7, wherein a protective cover (5) that can be latched to the mounting element (10) is provided that covers the side areas (3*b*) of the two adjacent wall panels (3) to the outside.

9. Automatic storage system (1) according to claim 8, wherein the protective cover (5) forms at least one outer surface (5*h*) that at least sectionwise lies flush with a wall outer surface (la) formed by outer wall segments (3*a*) of the at least two wall panels (3).

10. Automatic storage system (1) according to claim 8, wherein the protective cover (5) comprises at least one support segment (Si) that lies at least in segments on the side areas (3*b*) of the two adjacent wall panels (3).

11. Kit for storage systems (1), comprising at least one support member (8) for constructing a support structure of a storage system (1) enclosing an automatic storage volume (S) with a paternoster storage system or storage lift, or a crane that can be driven in a storage aisle, the kit comprising at least one mounting segment (8*b*) for attaching wall panels (3), wherein the mounting segment (8*b*) is designed as a latching element with at least one mounting surface (8*c*) facing into the direction of the storage volume (S) and/or which is provided with at least one wall panel (3) that can be latched to the support member (8) that on opposing sides of an outer wall segment (3*a*) forms an outwardly facing outer wall surface (1*a*) with two side areas (3*b*) that extend transversely to the outer wall segment, each equipped with at least one mounting surface integrated into the side areas (3*b*) and an attachment segment (3*c*) designed as a latching element with at least one outwardly facing mounting surface (3*d*), wherein the kit further comprises at least two wall panels (3), and wherein a mounting element (10) is provided that is configured to be inserted in a positive fit between side areas (3*b*) of the at least two wall panels (3) which are adjacent in a horizontal direction (H), by means of which the side areas (3*b*) can be connected in a manner in which they support one another.

12. Kit according to claim 11, wherein the mounting element (10) has a cross-shaped profile (10*f*) in a horizontal direction (H).

13. Method for assembling an automatic storage system (1), from a kit according to one of claim 11 or 12, in which at least one wall panel (3) is placed onto at least one support member (8) substantially transverse to a longitudinal direction (L) of the support member (8), wherein during the placement, at least one mounting segment (8*b*) of the support (8) automatically engages in a positive fit in at least one attachment segment (3*c*) of the wall panel (3), and wherein a mounting element (10) is inserted into a crossed slot formed by four meeting wall panels (3) and is subsequently moved in a vertical direction (V).

14. Method according to claim 13, wherein a protective covering (5) is latched to the mounting element (10).

\* \* \* \* \*